Sept. 22, 1964   H. BAUMANN ETAL   3,149,819
DEVICE FOR PROTECTING A BEARING AGAINST HEAT
Filed Feb. 8, 1962

INVENTORS
Hans Baumann
Jean Eggmann
BY
Pierce, Scheffler & Parker
Attorneys

United States Patent Office 3,149,819
Patented Sept. 22, 1964

3,149,819
DEVICE FOR PROTECTING A BEARING AGAINST HEAT
Hans Baumann, Nussbaumen, and Jean Eggmann, Baden, Switzerland, assignors to Aktiengesellschaft Brown, Boveri & Cie, Baden, Switzerland, a joint-stock company
Filed Feb. 8, 1962, Ser. No. 171,917
Claims priority, application Switzerland Feb. 14, 1961
4 Claims. (Cl. 253—39.15)

The invention concerns a device for protecting a bearing against heat, particularly a gas bearing for a turbomachine with a hollow shaft, where the hot blade wheel is in the vicinity of the bearing.

With turbo-machines whose blade wheels are exposed to a high temperature during service, it is important to protect the bearings against varying heat effects, especially when the blade wheel is located near the bearing. Steel, the material mostly used for shafts, does not have a sufficiently high thermal conductivity to ensure an adequately quick distribution of the heat which reaches the shaft from one side. The temperature gradient up to the end of the shaft is therefore very considerable and this causes unequal thermal expansions in the shaft, whereby these can already reach such a magnitude within the range of the bearing that the latter may become damaged. With gas bearings this danger is particularly great because they have a considerable width and the bearing clearance only amounts to a few thousands of a millimetre. Cooling the hollow shaft with gas by means of self-ventilation does not help in this case, on account of the strong one-sided heating effect.

In order to avoid these disadvantages, in accordance with the invention a heat distributing and cooling element is located inside the hollow shaft in good contact with the latter and which extends approximately over the width of the bearing.

Figure 1:
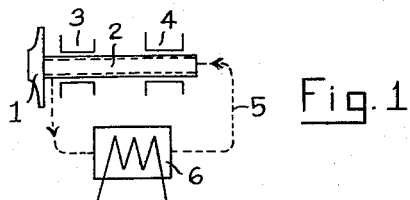
Figure 2:
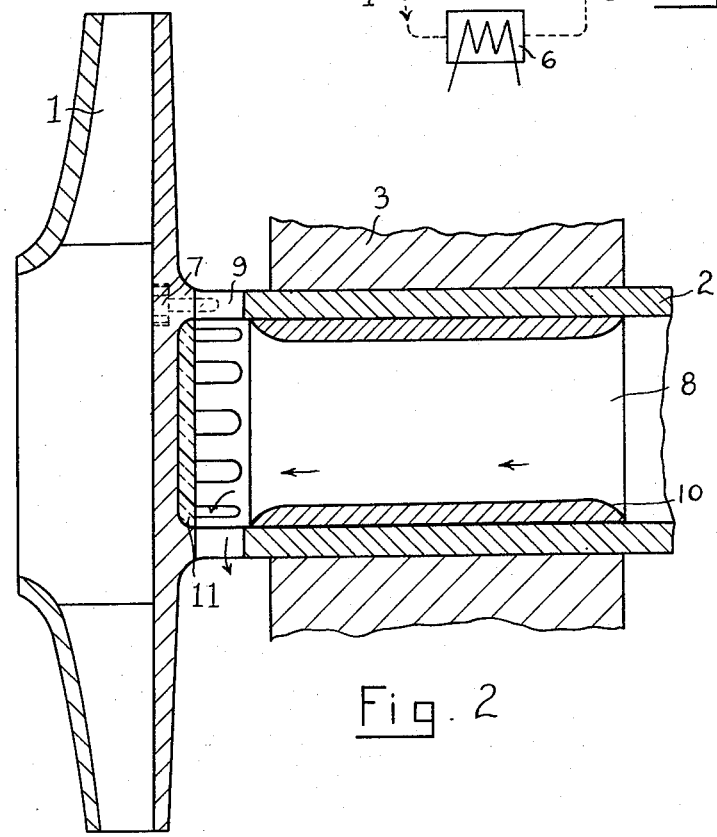
Figure 3:
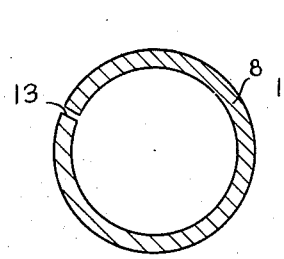
Figure 4:
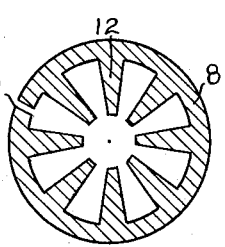
Figure 5:
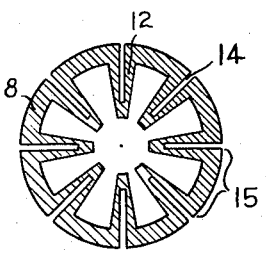

A constructional example of the invention is shown in the drawing. FIG. 1 shows schematically the bearing arrangement for the blade wheel and also the cooling gas system; FIG. 2 shows an axial section taken through part of the plant of FIG. 1; FIGS. 3, 4, and 5 each show a radial sectional view of various constructional forms of a part of the device according to the invention. In all figures the same parts are designated by the same reference numbers.

FIG. 1 shows the overhang-mounted blade wheel 1 of a compressor for compressing hot gas, the wheel being mounted on a hollow shaft 2 supported in bearings 3, 4. To protect the plant, especially bearing 3 against excessive temperatures, a cooling circuit 5 is provided whereby the cooling gas enters the outer end of the hollow shaft and leaves it between blade wheel 1 and bearing 3, the wheel and bearing being located near to each other for constructional reasons. The cooling system does not require a blower, because the hollow shaft automatically sucks in the cooling gas and discharges it again. The pressure difference which thus occurs is sufficient to overcome the flow resistance of the pipes in the water-cooled gas cooler 6.

As shown in FIG. 2, the blade wheel 1 is attached to the hollow shaft 2 by means of screws 7. At the point of abutment the heat from the hot blade wheel passes into the hollow shaft and travels towards the right. Since the heat cannot be carried away or dispersed quickly enough, the heat would accumulate, but this is prevented by element 8 which acts as a heat distributing and cooling element. This element, in its simplest form consists of a hollow cylinder i.e. a bush (FIG. 3), which is fitted into the hollow shaft 2 and extends approximately over the width of bearing 3. This cylinder should extend as far as possible to the left beyond the bearing when the construction permits such an arrangement (FIG. 2). In this way, it comes into contact with the hottest part of the hollow shaft and the heat which enters is rapidly conducted away and dispersed uniformly by means of the distributing and cooling element, because the latter consists of a material with a very good thermal conductivity.

Due to the rapid and uniform distribution of the heat over the cooling element 8 and as a result of its thermal properties, its cooling action is more effective than the known cooling action of the hollow shaft, on the assumption that conditions are equal. As already described in connection with FIG. 1, hollow shaft 2 automatically sucks in the cooling gas. It flows through the cooling element where it absorbs heat, whereupon it is discharged radially outwards through ducts 9, like in a radial-flow type compressor, and then passes to a recooler 6 where heat is extracted. In order to diminish the flow resistance, it is expedient to round off the inner edges of the cooling cylinder. The cooling element must of course be secured in position so that no axial displacement is possible.

It is expedient to construct the ducts 9 in the form of recesses provided in the end of the hollow shaft, whereby the contact surface with the hot blade wheel is greatly reduced. The ducts act as a heat throttle so that less heat can pass to the hollow shaft. A further improvement can also be achieved by providing an insulation layer 11 between the blade wheel and the hollow shaft. Since it is not desirable to cool the blade wheel with the cooling gas which flows past it, the wheel is provided with an insulation 11 at the end of the hollow shaft.

In order to increase the cooling surface and thus the effect of the heat distributing and cooling element 8, the latter can be provided on the inside with cooling ribs 12 (FIG. 4) which are arranged either axially or spirally.

The heating distributing and cooling element is made of a material, such as aluminium, copper or silver, which when compared with steel has a much higher thermal conductivity. These materials also have a higher coefficient of expansion than steel. The cooler element thus expands to a greater extent than the hollow shaft which surrounds it like a shrink and thus gives rise to stresses. A possibility would be to provide a certain clearance between the cooling element and the hollow shaft which disappears due to the heating effect, but this necessitates very accurate machining of both parts and therefore additional production costs. Moreover when starting up, that is when the cooling element has only a slight contact with the hollow shaft, the heat conduction and dispersion is poor, so that the bearing would be endangered.

In order to overcome this disadvantage, a radial slot 13 is provided in the cooling element 8 which extends over its entire length, the slot being either parallel to the axis or adapted to follow the cooling ribs. The cooling element, which otherwise is rigid, thus becomes flexible in the radial direction. It can therefore be fabricated so as to be a good fit or even have a slightly greater diameter than the internal diameter of the hollow shaft, whereby in the latter case it is compressed so as to be a spring fit. By this means, when starting the machine, the cooling element already has good contact with the hollow shaft and during service the contact pressure increases due to the centrifugal effect. Differences in thermal expansion no longer cause any stresses in the hollow shaft because they are compensated by slot 13. Since it is no longer necessary to adhere strictly to a prescribed diameter, it is possible to work with a considerable tolerance and this reduces production costs.

Another modified constructional form of the heat distribution and cooling element is illustrated in FIG. 5. In this case the cooling element has not merely a single slot 13 but a number of slots 14 which commence at the periphery of the cooling element 8, extend over its entire length, and pass in the radial direction into the cooling ribs 12. This construction possesses the advantage that it is more flexible than that shown in FIG. 4, because the cooling element is divided by the large number of slots into individual sections 15 which are capable of a certain mutually independent displacement so that during service they can establish better and more reliable contact with the hollow shaft. This type of cooling element is also more compressible, thus facilitating its assembly.

We claim:

1. In a turbo-machine such as a turbine or a compressor with gas lubricated bearings and wherein at least one of said bearings is located closely to the bladed rotor of said machine and which is mounted on a hollow cylindrical shaft extending through said bearing, the improvement wherein a hollow bush for heat distribution and cooling is located within that part of said hollow shaft which extends through said bearing, said hollow shaft being made from steel and said hollow bush being made from a metal having a coefficient of heat conductivity higher than that of the steel, said hollow bush and hollow shaft being traversed interiorly thereof by a gaseous coolant, and said hollow bush extending substantially for the length of said bearing and being in surface contact with the interior surface of said hollow shaft throughout its length.

2. The invention as defined in claim 1 wherein said hollow bush includes cooling ribs on the inside thereof.

3. The invention as defined in claim 1 wherein said hollow bush is provided with a slot extending for the entire length thereof to permit radial expansion by centrifugal force into firmer contact with the interior surface of said hollow shaft.

4. The invention as defined in claim 1 wherein said hollow bush includes cooling ribs on the inside thereof and each of said ribs is provided with a slot extending to the outer surface of said bush, said rib slots extending for the entire length of said bush.

References Cited in the file of this patent

UNITED STATES PATENTS

| | | |
|---|---|---|
| 2,173,489 | Voigt | Sept. 19, 1939 |
| 2,229,799 | Dean | Jan. 28, 1941 |
| 2,717,732 | Dailey | Sept. 13, 1955 |